3,350,191
METHOD OF DESUCKERING TOBACCO PLANTS WITH DI- AND TRI-THIOCARBONATES AND THIODICHLOROMETHYLSULFIDES

Don R. Baker, Pinole, Harold M. Pitt, Lafayette, and Stassen Y. C. Soong, San Jose, Calif., assignors to Stauffer Chemical Company, New York, N.Y., a corporation of Delaware
No Drawing. Filed June 9, 1964, Ser. No. 373,852
6 Claims. (Cl. 71—78)

ABSTRACT OF THE DISCLOSURE

Method of controlling the growth of lateral buds of a mature tobacco plant by applying thereto a growth controlling amount of a compound having the formula

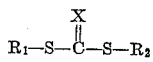

wherein $R_1$ and $R_2$ are (1) alkyl, (2) cycloalkyl, (3) halogen, hydroxyl or lower alkyl substituted alkyl or cycloalkyl radicals; and X is chlorine, oxygen or sulfur.

---

This invention relates to a method for the control of secondary axil growth of tobacco plants. Specifically, it pertains to the control of tobacco sucker growth by the use of certain substituted diethiomethylene derivatives as plant growth regulators.

Tobacco plants are decapitated or topped at predetermined stages of growth. The purpose of such top growth removal of the tobacco plant is to direct toward increased leaf development the inherent growing potential of the plant. This growth activity would normally otherwise lead to formation of seed head. Topping, as it is commonly referred to, induces increased growth of the remaining leaves, promotes uniform leaf size, causes increased density in the body of the leaves and increases the nicotine content by preventing the development of the seed head.

However, topping also breaks the apical dominance and induces the lateral buds to grow into lateral shoots which are termed suckers. If lateral buds or shoots appearing in the leaf axils are allowed to develop, the usual beneficial effects of topping are greatly diminished. If these suckers are not controlled by some manner or removed, too much of the potential growth will be drained from the plant by the development of these shoots. The result will be that low quality tobacco leaves will be produced over the whole plant. This greatly influences the economic value of the leaves.

There are several widely known methods in prior art for controlling the undesirable development of tobacco suckers. The oldest method still employed in certain parts of the country where tobacco is grown is the manual separation of the sucker from the plant. This method is slow and highly ineffective. This method requires that for proper control of a field of tobacco, plants will have to be repeatedly worked over at weekly intervals to manually remove the sucker buds as they develop.

Another method depends upon the use of certain oils, such as used motor oils, to control the growth of lateral buds. If improperly employed, the commonly used oils will cause severe crop losses. The use of such oils can result in extensive burning or rotting or a combination of the two effects on the so treated tobacco plant. Often times this treatment will lead to the complete destruction of the entire plant from these effects or to localized effects on the plant. Localized destruction of plant tissue from these effects is not fatal in itself to the leaf products, but other side effects can take place, such as weakened resistance which will allow the entry of bacteria or other plant-injuring agents.

Methods for sucker control relying upon chemical means have not been entirely successful nor have they been readily accepted. It is reported that heretofore even the most widely used chemical will not give consistent results under all conditions. Certain factors such as temperature, weathering and application affect the results. Certain chemicals require that the suckers which have begun to develop are removed prior to or immediately following its application in order that the inhibitor control subsequent sucker growth. The inhibitors have no effect on developed lateral buds, but only in controlling growths after application. Weathering is important wherein a chemical will decompose or volatize before it can be effectively incorporated in the plant to inhibit sucker formation.

Several economic factors enter the use of presently known chemical methods for sucker control. The grower finds objection because the growth of young leaves is affected by the use of certain chemicals. This at the same time has a definite influence upon the value of the tobacco crop. However, growers continue to use the chemical method as opposed to the abovementioned manual removal of suckers on a weekly schedule. Manufacturers who utilize tobacco in their products object to the use of certain chemicals for sucker control because they affect the flavor of the tobacco product and because of the effect certain chemicals have on the quality of the leaves which then yield less usable tobacco.

Various types of tobacco will be affected in different ways when treated with oils and chemicals as mentioned above. For example, Burley tobacco is more drastically affected by the oil and chemical treatment for sucker control than are the Flue-cured varieties. Certain chemicals will cause the top leaves of Burley to have an undesirable yellow color, which indicates a chlorosis effect on this type of tobacco. Oils have destroyed significant portions of Burley plants because of extensive blackening and rotting. For this reason the recommended methods for use on Burley and other types of tobacco must be improved.

A general object of the present invention is, therefore, to provide a new method for the control of tobacco suckers, said method involving the use of certain substituted-dithiomethylene derivatives.

It is a further object to provide a group of compounds which affect only the secondary axil growth of the mature tobacco plant and having no adverse effect on the remaining portions of the plant. This will then eliminate the hand-removal of suckers which have begun to form prior to the application of the compounds.

Pursuant to the above-mentioned and yet further objects, it has been found that substituted-dithiomethylene derivatives defined by the formula

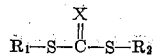

wherein $R_1$ and $R_2$ are selected from the group consisting of alkyl, cycloalkyl, substituted alkyl, and substituted cycloalkyl radicals, wherein said substituents are selected from the group consisting of halogen, hydroxyl and lower alkyl; X is selected from the group consisting of chlorine, oxygen and sulfur, are effective as plant growth regulators to control the development of tobacco suckers.

taken 2–3 weeks following treatment. The number of suckers, their positioning on the plant and the plant growth were rated. Control was measured by comparing the weight of suckers from the treated plants with the weight of those from the untreated check as a basis of percent control. The following table summarizes the results obtained.

$$R_1-S-\overset{\overset{X}{\|}}{C}-S-R_2$$

| Compound Number | $R_1$ | $R_2$ | X | Activity, Percent Reduction of Tobacco Sucker Weight |
|---|---|---|---|---|
| 1 | ClCH$_2$CH$_2$— | —CH$_2$CHClCH$_2$Cl | Cl$_2$ | 95 |
| 2 | Cyclohexyl | —CH$_2$CHClCH$_2$Cl | Cl$_2$ | 94 |
| 3 | Cyclohexyl | —CH$_2$CHClCH$_2$Br | Cl$_2$ | 95 |
| 4 | CH$_3$CH$_2$— | —CH$_2$CH$_2$Cl | O | 44 |
| 5 | CH$_3$— | —CH$_2$CH$_2$Cl | O | 67 |
| 6 | HOCH$_2$CH$_2$— | —CH$_2$CH$_2$OH | O | 29 |
| 7 | (CH$_3$)$_2$CClCH$_2$— | —CHClCHCl$_2$ | S | 31 |
| 8 | n-C$_3$H$_7$— | —CH$_2$CH$_2$Cl | O | 33 |
| 9 | CH$_3$CHClCH$_2$— | —CHClCHCl$_2$ | O | 43 |
| 10 | CH$_2$ClCH$_2$— | —CHClCHCl$_2$ | O | 27 |
| 11 | CH$_3$CH$_2$CHClCH$_2$— | —CHClCHCl$_2$ | O | 27 |
| 12 | 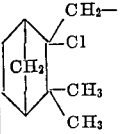 | —CHClCHCl$_2$ | O | 21 |

Generally, the above-mentioned compounds can be prepared by utilizing one of the following methods according to the equations:

(A) $$RS\overset{\overset{X}{\|}}{C}Cl + RC=CR \longrightarrow RS\overset{\overset{X}{\|}}{C}S\overset{\overset{R}{|}}{C}CClR$$

wherein X is dichloro or sulfur.

(B) $$R_1S\overset{\overset{X}{\|}}{C}Cl + HSR_2 \longrightarrow R_1S\overset{\overset{X}{\|}}{C}SR_2 + HCl$$

wherein X is sulfur or oxygen.

(C) $$2RSH + Cl\overset{\overset{X}{\|}}{C}Cl \longrightarrow RS\overset{\overset{X}{\|}}{C}SR + 2HCl$$

wherein X is sulfur or oxygen.

R, $R_1$ and $R_2$ represent the appropriate organic radicals as defined in the generic formula, supra.

To achieve control of tobacco suckers, the compounds may be applied to mature tobacco plants in the form of solutions, emulsions, dust formulations, pastes and the like. Any of the methods may be used; however, methods in which the entire plant is contacted with active compound are less desirable because the disclosed compounds in higher concentration levels can cause damage to the tobacco leaf and even the tobacco plant itself. Therefore, it is preferred to use methods of controlled application. The object of the method of applicaton is to contact each leaf axil with active material, thereby resulting in control of the sucker.

The following examples describe tests illustrative in the manner in which the compounds of the present invention control tobacco suckers.

*Example*

One hundred milligrams of chemical candidate were dissolved in 5 cc. of acetone and diluted with 15 cc. of water to make a total of 20 cc. of solution to spray one plant. The tobacco plants used in the test were grown in a greenhouse for two months to a height of about two feet. The plants were decapitated before treatment. The top surface of all the remaining leaves on the plant were sprayed thoroughly with an atomizer. The concentration of the solution as prepared above was 0.5%. Ratings were As can be seen from these results, the size of the sucker was reduced to some extent in each case. The decrease in weight was accompanied by a decrease in length as compared to untreated species of tobacco plant. Whereas only moderate activity is seen with some compounds in the range tested, it is to be understood that several factors contribute to the effect noted. Such factors as age of the plants, time of application, method of application, weather conditions and the like will govern the rate of application. It is therefore contemplated that depending on conditions, more or less of the active compound may be used as needed to effect control.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. A method of controlling the growth of lateral buds of a mature tobacco plant comprising applying thereto a growth controlling amount of compound corresponding to the formula $$R_1-S-\overset{\overset{X}{\|}}{C}-S-R_2$$

wherein $R_1$ is selected from the group consisting of lower alkyl, cycloalkyl having from 3 to 8 carbon atoms, and substituted derivatives thereof, wherein the substituents are selected from the group consisting of halogen, hydroxyl and lower alkyl; $R_2$ is selected from the group consisting of substiuted lower alkyl and substituted cycloalkyl having up to 7 carbon atoms wherein the substituetnts are selected from the group consisting of halogen and hydroxyl; and X is selected from the group consisting of chlorine, oxygen and sulfur.

2. A method of controlling the growth of lateral buds of a mature tobacco plant comprising applying thereto a growth controlling amount of the compound 2-chloroethylthiodichloromethyl-2,3-dichloropropyl sulfide.

3. A method of controlling the growth of lateral buds of a mature tobacco plant comprising applying thereto a growth controlling amount of the compound cyclohexylthiodichloromethyl-2,3-dichloropropyl sulfide.

4. A method of controlling the growth of lateral buds of a mature tobacco plant comprising applying thereto a growth controlling amount of the compound cyclohexyl-thiodichloromethyl-2-chloro-3-bromopropyl sulfide.

5. A method of controlling the growth of lateral buds of a mature tobacco plant comprising applying thereto a growth controlling amount of the compound S-methyl S-(2-chloroethyl)-dithiocarbonate.

6. A method of controlling the growth of lateral buds of a mature tobacco plant comprising applying thereto a growth controlling amount of the compound S-(2-chloro-isobutyl)-S-(1,2,2-trichloroethyl) trithiocarbonate.

References Cited

UNITED STATES PATENTS

| 3,166,580 | 1/1965 | Stanley | 260—455 |
| 3,180,790 | 4/1965 | Goodhue | 167—22 |
| 3,284,467 | 11/1966 | Pitt et al. | 260—327 |
| 3,287,417 | 11/1966 | Bender et al. | 260—609 |

LEWIS GOTTS, *Primary Examiner.*

M. M. KASSENOFF, *Assistant Examiner.*